(12) United States Patent  (10) Patent No.: US 7,920,251 B2
Chung  (45) Date of Patent: Apr. 5, 2011

(54) INTEGRATED STILL IMAGE, MOTION VIDEO AND SPEED MEASUREMENT SYSTEM

(75) Inventor: Jiyoon Chung, Aurora, CO (US)

(73) Assignees: Laser Technology, Inc., Centennial, CO (US); Kama-Tech (HK) Limited, Tsim Sha Tsui (HK)

( * ) Notice: Subject to any disclaimer, the term of this patent is extended or adjusted under 35 U.S.C. 154(b) by 80 days.

(21) Appl. No.: 12/236,288

(22) Filed: Sep. 23, 2008

(65) Prior Publication Data

US 2009/0079960 A1  Mar. 26, 2009

Related U.S. Application Data

(60) Provisional application No. 60/974,694, filed on Sep. 24, 2007.

(51) Int. Cl.
*G01P 3/36* (2006.01)
*G01C 3/08* (2006.01)

(52) U.S. Cl. .......................... 356/28; 356/4.01

(58) Field of Classification Search ................ 356/4.01, 356/5.01, 28, 28.5; 382/103, 106, 107
See application file for complete search history.

(56) References Cited

U.S. PATENT DOCUMENTS

| | | | |
|---|---|---|---|
| 5,938,717 A | 8/1999 | Dunne et al. | |
| 6,111,523 A * | 8/2000 | Mee | 340/937 |
| 6,546,119 B2 * | 4/2003 | Ciolli et al. | 382/104 |
| 6,618,075 B2 * | 9/2003 | Tomita | 348/157 |
| 6,681,195 B1 | 1/2004 | Poland et al. | |
| 6,985,827 B2 | 1/2006 | Williams et al. | |
| 7,107,179 B2 | 9/2006 | Malchi | |
| 7,323,987 B2 * | 1/2008 | Seas et al. | 340/557 |
| 7,339,495 B2 * | 3/2008 | Kavner | 340/933 |
| 2003/0080878 A1 | 5/2003 | Kirmuss | |

OTHER PUBLICATIONS

Notification of Transmittal of the International Preliminary Report on Patentability, PCT/US08/77392 and International Preliminary Report on Patentability, mailed Jul. 7, 2010, pp. 32.

* cited by examiner

*Primary Examiner* — Isam Alsomiri (74) *Attorney, Agent, or Firm* — William J. Kubida; Scott J. Hawranek; Hogan Lovells US LLP (57) ABSTRACT

Devices capable of capturing still and motion imagery are integrated with an accurate distance and speed measuring apparatus. By measuring the changing distance of the target over that time, a target's speed can be determined. At substantially the same time as the target's speed is determined, imagery of the target is captured in both a still and moving format. Using a queuing mechanism for both distance and imagery data along with time stamps associated with each, a target's image, both in motion and still, can be integrated with its speed. In situations in which a still image is unavailable, a target's speed can be associated with a portion of a continuous stream of motion imagery to a point where a positive identification can be captured with a still image.

15 Claims, 5 Drawing Sheets

INTEGRATED STILL IMAGE, MOTION VIDEO AND SPEED MEASUREMENT SYSTEM

RELATED APPLICATION

The present application relates to and claims the benefit of priority to U.S. Provisional Patent Application No. 60/974,694 filed Sep. 24, 2007, which is hereby incorporated by reference in its entirety for all purposes as if fully set forth herein.

BACKGROUND OF THE INVENTION

1. Field of the Invention

Embodiments of the present invention relate, in general, to systems and methods for measuring the speed of an object and more particularly to integrating still image and motion picture data of an object with the simultaneous determination of the speed of that object.

2. Relevant Background

The measurement of an object's speed relative to a stationary point can be accomplished by a variety of devices. It is well known that law enforcement and similar agencies use RADAR and laser measuring equipment to aid in the enforcement of traffic laws. Laser ranging equipment and speed determination is at the forefront of this technology. Laser rangefinders, through a series of pulsed laser bursts, can determine the speed of a vehicle at a range previously unobtainable using RADAR technology. Lasers are extremely accurate and thus, when properly aimed, can be used at ranges far exceeding those of a RADAR system.

As technology evolves, laser based speed detection devices continue to expand the range at which such a device may be employed. Thus, given an accurate aiming system, it is possible for a laser detection device to accurately ascertain the speed of a vehicle at a substantial distance.

To enforce a ticket based on a speed measurement, evidence must generally be presented to accurately identify the vehicle at the precise time the measurement, i.e. violation, occurred and to link the identity of the operator to that instant in time. A vehicle, after all, does not receive a ticket, the operator does. One means to link a speed measurement of a vehicle to the operator is with the use of still and motion imagery.

Synchronizing the exact image with the instance of speed detection, however, is problematic. Simply coupling a still image camera or a motion picture camera to a speed detection device involves considerable processing time. The communication delay among the initiating command to take a speed measurement, determining whether a violation has occurred and capturing either or both a still or motion image at the precise time that violation occurred may render the violation moot. Furthermore, the components comprising such a system are often cost prohibitive.

To accurately and legibly capture the image of a license plate of a vehicle at the employable range of a laser based speed detection device would require a lens/camera system that is extremely expensive. Yet to use a more common and cost effective lens would defeat the use of the laser rangefinder. For example, assume a vehicle's speed could reliably be measured as violating a law at a distance of 2 miles, yet at this range a legible picture of the license plate and the operator cannot be economically produced. By the time that the vehicle is within range of a camera that can produce an image in which the vehicle and the operator can be discerned unquestionably, the vehicle is likely to have slowed and is no longer violating the law. Thus the enforcement agency is faced with a difficult task of linking data indicative of a violation to an operator and/or vehicle that otherwise appears to be obeying the law. These and other challenges are addressed by the invention described hereafter.

SUMMARY OF THE INVENTION

Systems and methods for integrating still and motion imagery with speed measurement are hereafter disclosed. According to one embodiment of the present invention, a still image capture device, a motion imagery device and a speed detection device are integrated into a single system. In one embodiment of the present invention, a laser rangefinder is used to accurately determine the range of a target over a specified period of time. By measuring the changing distance of the target over that time, as well as the changing roll, pitch and orientation of the laser over that time, the target's speed can be determined. At substantially the same time as the target's speed is determined, imagery of the target is captured in both a still and moving format.

In another aspect of the present invention, the system has the ability to queue both imagery information and the mechanisms for speed measurement. The time delay between when a speed measurement is initiated to when the speed of a vehicle is determined and/or an image captured is finite but variable in each instance. According to one embodiment of the present invention, imagery and distance measurement data are acquired on a real time basis, placed in a queuing mechanism and identified within the queue by a specific time stamp. Upon receiving a trigger indication, the time stamp associated with that trigger initiation is synchronized with those of the imagery and the distance measurement data. The result is a presentation of speed and image data, both still and motion, that occur at precisely the same time.

According to another aspect of the present invention, when the range to the target upon determining the target's speed is such that the image would be legible and would likely withstand the rigors of a legal proceedings, the image is integrated with the target's determined speed as previously described. When the target's speed is ascertained at a range in which the imagery is likely illegible or is of a quality that would render positive identification of the vehicle in question, motion imagery is established to track the vehicle from the point at which the speed is determined to one in which a clear and legible still image of the vehicle and/or the operator can be obtained. Continual updates are conducted until a still image is captured.

According to another embodiment of the present invention, processing time for determining the speed of the target is reduced by using a sliding sampling window. A laser rangefinder determines a target's speed by sending out a series of laser pulses and measuring the time until the pulses return. By sampling a series of pulses over a period of time, the change in distance of the target over that period of time can be determined and thus so can the speed of the target. One consideration in conducting such a determination is the quality of the returned pulses. To accurately determine the distance to the target and thus the speed of the target based on those changing distances, the returned pulses from the laser must conform to various parameters and conditions over a sampling window. Rather than moving the window from one sampling period to another adjacent window as is know in the prior art, the present invention uses, according to one embodiment, a sliding window. As the window moves, the returned pulses are evaluated and, when they meet the required parameters and conditions, an accurate distance/speed can be determined. By using a sliding window, the latency of speed determination can be reduced significantly thus minimizing processing time.

According to another aspect of the invention, the present invention disclosed herein advantageously provides a single, unitary, hand held system operative to acquire still and motion imagery of a moving object along with its speed, utilizing a common processor for both the image sensor and laser sub-system. Power for the unit is provided by a battery pack located within the hand held unit housing and no additional external power sources are required. Through the tight integration of all of the image, speed determination, display and other system functions, a portable, light weight, compact and low cost unit is provided that affords greater precision and functionality while requiring less power than existing traffic enforcement systems.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Embodiments of the present invention tightly integrate speed detection and determination based on a laser rangefinder with simultaneous capturing of still and motion imagery. By integrating the functionalities of the image capture process, speed detection and other functions into a single hardware platform, communication delay and bandwidth constraints of the prior art can be minimized. Simultaneous still and motion imagery can be gained at the precise time that a speed violation has occurred. These determinations and imagery can be correlated with position identification means such as Global Positioning System ("GPS") data and other factors to provide an enforceable chain of evidence regarding a particular violation.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 1:
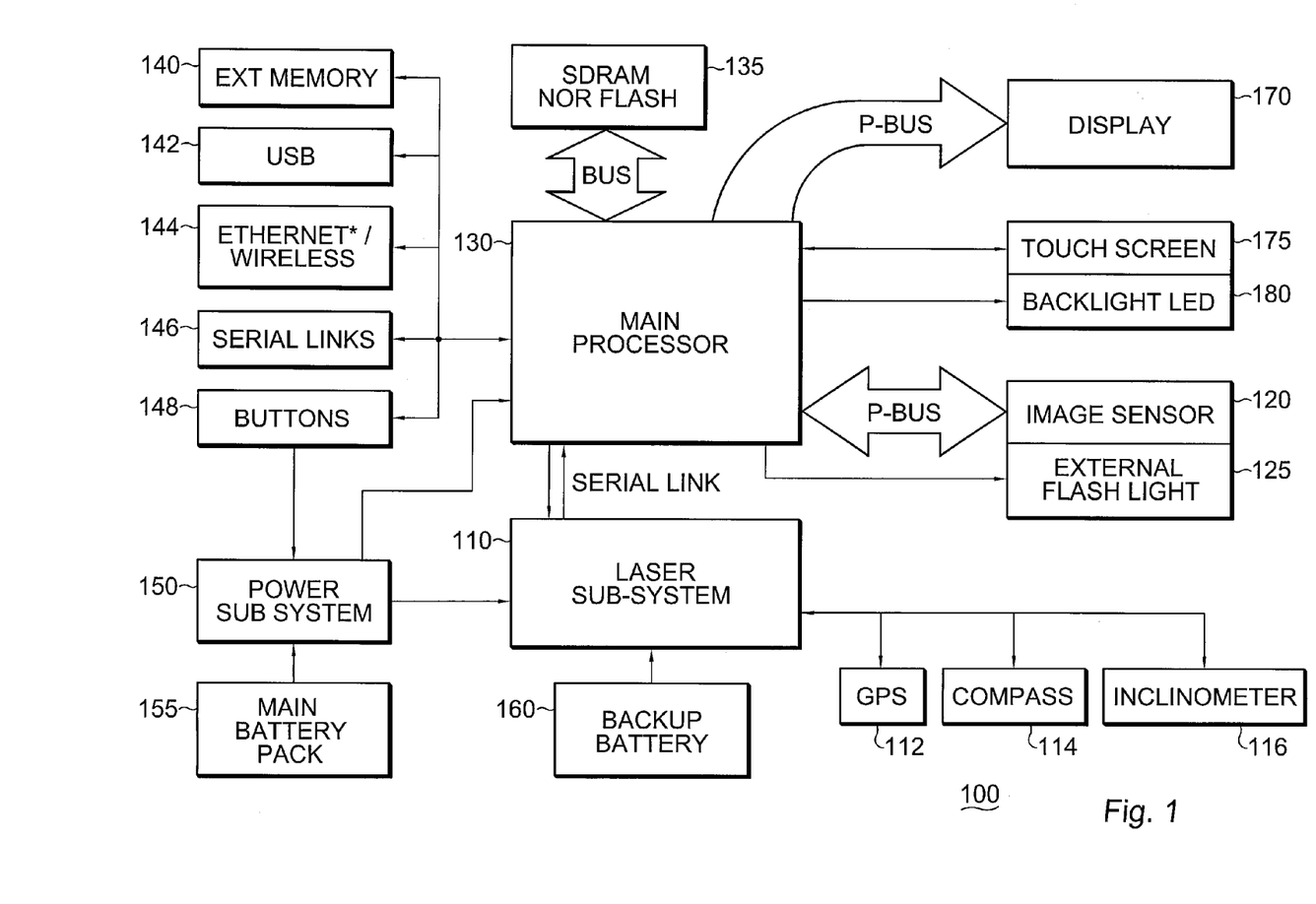
FIG. 1 is a high level block diagram for an integrated image and speed measurement system according to one embodiment of the present invention.

FIG. 1 is a high level block diagram depiction of a system for integrating imagery with distance measuring equipment according to the present invention. The system 100 is generally comprised of a distance measuring device laser sub-system 110 such as a laser rangefinder, an image sensor 120 and a main processor 130. The distance measuring device 110 can, in one embodiment of the present invention, be a laser rangefinder sub-system controlled by a conventional imbedded processor such as NXP LPC2136. This laser sub-system can include local memory for intermediate calculations and distance determination and can also be linked to a global positioning system component 112, a compass 114 and an inclinometer 116.

The present invention may be implemented on any conventional central processing unit(s) (CPU) or processor(s) 130 such as a ATMEL AT32AP7000 processor or the like. The image sensor 120 is generally a Complementary Metal-Oxide-Semiconductor ("CMOS") image sensor with the ability to dynamically adjust resolution from a motion image of 480×360 pixels to a still image resolution of 1920×1440 pixels. Other embodiments of the image sensor 120 can include an external flash light 125 for low light operations. While the CMOS image sensor 120 is coupled to the processor via a peripheral bus, the distance measuring device laser sub-system 110 is coupled to the processor 130 via a serial link. The system 100 also includes random access memory 135 ("RAM") in the form of synchronous dynamic RAM and/or NOR Flash coupled to the processor via a memory bus.

Further coupled to the processor are ancillary ports such as an SD card slot interface 140 for external memory, a USB port 142, an Ethernet or wireless Ethernet port 144, serial links 146 and various I/O interfaces 148 which in a preferred embodiment are buttons. These I/O interfaces 148 are further coupled to a power supply 150 sub-system that regulates power supplied by a main battery pack 155. A backup battery pack 160 is coupled to the laser sub-system to provide power to the real-time clock and GPS aid in an improved acquisition time.

Further coupled to the processor via the peripheral is a display device 170 such as a color liquid crystal display. In one embodiment of the present invention, the display device 170 can include a touch screen 175 for input/output functionality and backlight light emitting diodes 180 for low light operations. Although not shown separately, a real time system clock is included with the system 100, in a conventional manner.

The main processor comprises a suitable processor 130 for implementing the present invention. The processor 130 communicates with other components of the system via a bidirectional system bus (including any necessary input/output (I/O) controller circuitry and other "glue" logic). The bus, which includes address lines for addressing system memory, provides data transfer between and among the various components. RAM 135 serves as the working memory for the processor 130. Read only memory present within the processor contains the basic input/output system code (BIOS)—a set of low-level routines in the ROM that application programs and the operating systems can use to interact with the hardware, including reading characters from the keyboard, outputting characters to printers, and so forth.

Mass storage devices 140 provide persistent storage on fixed and/or removable media, such as magnetic, optical, or magnetic-optical storage systems, flash memory, or any other available mass storage technology. The mass storage may be shared on a network, or it may be dedicated mass storage. Typically, the fixed storage device serves as the main hard disk for the system.

In basic operation, program logic (including that which implements methodology of the present invention described below) is loaded from the removable storage or fixed storage into the main (RAM) memory for execution by the processor 130. During operation of the program logic, the system accepts user input from a keyboard, pointing device or other user interface, as well as speech-based input from a voice recognition system (not shown). The keyboard permits selection of application programs, entry of keyboard-based input or data and selection and manipulation of individual data objects displayed on the screen or display device. Likewise, the pointing device, such as a mouse, track ball, pen device, or the like, permits selection and manipulation of objects on the display device. In this manner, these input devices support manual user input for any process running on the system.

The system 100 displays text and/or graphic images and other data on the display device 170. A video adapter, which is interposed between the display device 170 and the system's bus, drives the display device 170. A hard copy of the displayed information, or other information within the system 100, may be obtained from a printer or other output device.

The system 100 itself communicates with other devices (e.g., other computers) via a network interface card (NIC) connected to a network (e.g., Ethernet network, Bluetooth wireless network, or the like) via an Ethernet link 144. Devices that will be commonly connected locally to the interface include laptop computers, handheld organizers, digital cameras, and the like.

The single image sensor system 100 of the present invention captures both motion and still imagery, albeit with different resolutions. While some motion imagery devices possess the capability to isolate and capture still images, the present invention captures still and motion imagery simultaneously. The present invention enables sensory images to be captured continuously with the ability to dynamically control frame resolution between that of a motion image and that of a still image. The integrated system 100 of the present invention further combines distance and speed determination technology present in a laser rangefinder with still and motion imagery to demonstrate, in one embodiment of the present invention, evidence of motor vehicle traffic violations.

One aspect of the present invention is the system 100's ability to queue imagery information and the mechanisms for speed measurement. There is a finite but varying delay between the time a speed measurement is initiated to the time that the speed of a vehicle has been determined and/or an image captured. According to one embodiment of the present invention, imagery and distance measurement data are acquired on a real time basis, placed in a queuing mechanism and identified within the queue by a specific time stamp. Upon receiving an initiation indication, the time stamp associated with that trigger initiation is synchronized with those of the imagery and the distance measurement data. The result is a presentation of speed and image data that occur at precisely the same time.

Figure 2:
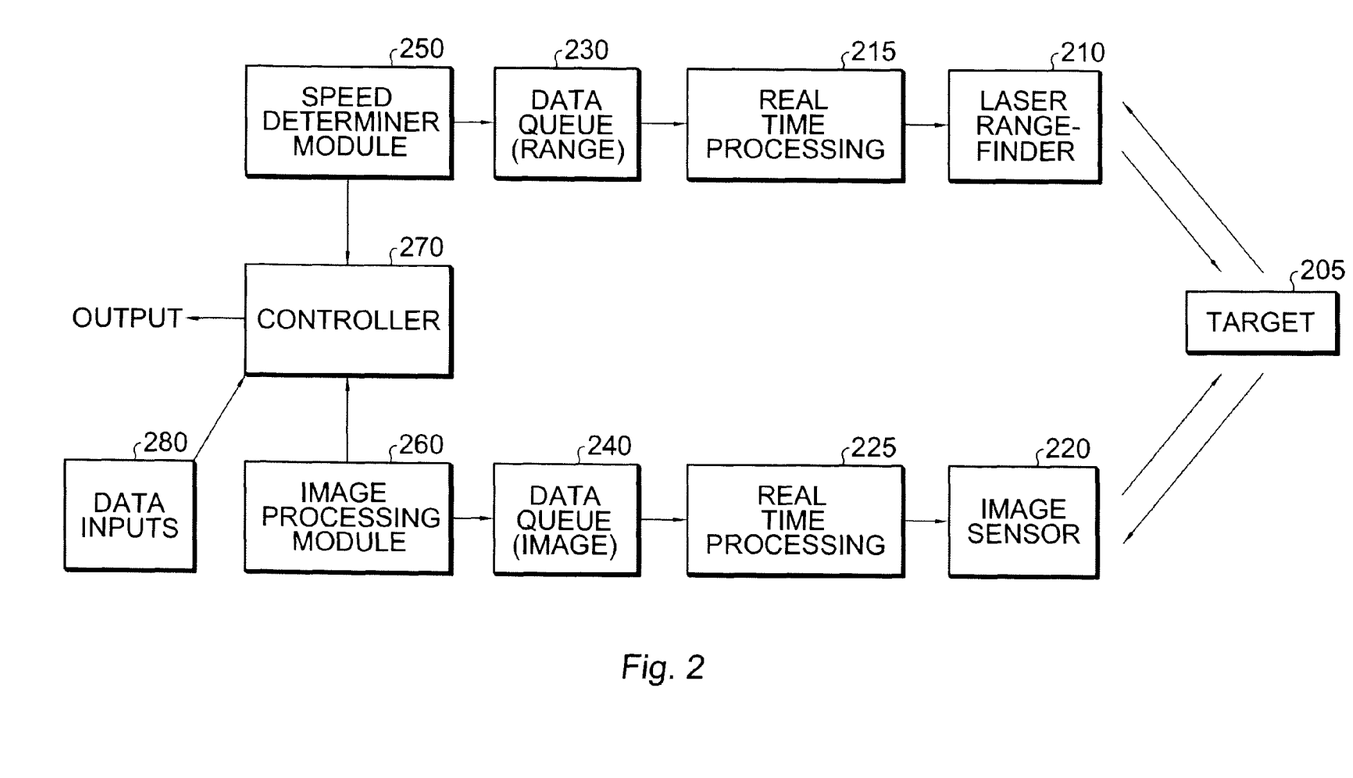
FIG. 2 is a high level block diagram of one data flow embodiment according to the integrated image and speed measurement system of the present invention.

FIG. 2 provides a high level block diagram illustrating data flow between various components and modules of one embodiment of the present invention. Upon initiation of the system 100, the image sensor 220 and the laser rangefinder 210 begin collecting data with respect to a target 205. According to one envisioned use of the present invention, the system 100 is aimed at an approaching vehicle that is suspected of violating traffic speed ordinances. Upon properly aligning the system to the target using a sighting scope or other means known to one skilled in the art, the system is initiated. Upon initiation, the laser rangefinder 210 transmits a plurality of laser pulses toward the target. Reflections of these pluses are returned to the laser rangefinder 210. Based on the time elapsed from the transmission of the pulses to the reception of the pulses' reflection, a distance can be determined. This distance data is given a time stamp and stored in the data queue 230 for later processing. Assuming the target is moving relative to the laser rangefinder, the distance over a period of time will change. By knowing the change of distance over a known period of time, the speed of the target can be determined. This process of distance and speed determination is accomplished by a real time processing module 215 and a speed determinator module 250.

Simultaneous with the determination of the target's speed, the image sensor 220 begins to collect imagery data. The imagery data is processed in real time and a time stamp is attached to the data as it is collected and stored in a data queue 240 before it is further processed by the image processing module 260 for display to the user.

A controller 270 interposed between the laser rangefinder 210 process of speed determination and the image sensor 220 process for capturing imagery acts to correlate the two sets of data. As one skilled in the art will appreciate, the processing of laser pulses and determinations of a target's speed is not instantaneous. Similarly, image processing is not without a (mite amount of processing time. With respect to speed determination, a series of range determination must be determined before an accurate speed can be found. Depending on the range to the target, environmental conditions and other factors, there may be a finite amount of elapsed time from when the process is initiated to when the system can accurately produce the target's speed.

With respect to the image sensor 220, the image capturing device must also make adjustments for the range to the target and environmental conditions. Significantly, the time period from when the system 100 is initiated to when the speed is determined and/or the images are captured is not the same, nor are these elapsed times consistent. According to one embodiment of the present invention, a queuing system maintains a record of the data from both the laser rangefinder 210 and the image sensor 220. Using time stamp information provided to both aspects of the system 100 from the controller 270 upon initiation, the images (frames) of the target can be precisely aligned with the speed determination.

In addition, and as shown in FIG. 2, other inputs can be considered and correlated to the speed and image data. Inputs 280 include global positioning system coordinates of the system 100 as well as roll, pitch, inclination and orientation of the device as it is being used. By gaining information such as this, as well as other environmental data, the scene in which the speed and image data were collected can be accurately reconstructed. For example, the exact location of the system 100 can be determined as well as how it was aimed at the vehicle. This data can be used to strengthen the validity of the data collected or used to arrive at an independent determination of speed which can be used as supplementary evidence of a violation.

The ability to integrate GPS and other data into the distance measurement and imagery data can also aid in reconstruction of an environment for later analysis. By using the precise GPS location of the system 100 as well as the roll, pitch and orientation of the viewing angle combined with distance measurements, an accurate depiction of a traffic or similar situation can be recorded for future analysis. In the event of a traffic accident or other incident in which the pertinent factors surrounding the incident may be ephemeral, embodiments of the present invention enable a user to capture, both in still and in motion imagery, an accurate depiction of the surrounding environment. This information can be used to craft an accident report or be used, if necessary, in court to support findings of fact with respect to the conditions present at an accident site or the results of such an accident.

Another feature of the invention is to provide still and motion imagery before the actual violation occurred. The amount (or size) of the queue can be adjusted to provide imagery data and distance measurement data before the initiating event occurred. For example consider a monitoring device that captures imagery and distance measurement data on a real time basis and that a violation is only realized after the act occurs, such as running a red light at an intersection. An officer can be monitoring an intersection and by the time the trigger is initiated to capture an image of the vehicle and the speed measurement, the violation is no longer present. The image captured is of a vehicle that is no longer in the intersection and traveling at a normal rate of speed. Thus evidence of a violation that occurred previous to the initiated capture of the event is missing. According to one embodiment of the present invention, real time data is stored temporarily for a predetermined period of time in a cache 230, 240. Based upon predetermined settings, a specific period of imagery and speed determination data can be stored or sent to non-volatile memory 140 once an event has been initiated. In the previous example, data for the previous several seconds is captured for later analysis and review based on an initiated event, i.e. a trigger pull. Still and/or motion imagery of the vehicle running the red light along with speed information is captured and presented as irrefutable evidence of a violation.

Another aspect of the present invention enables the capture of correlated speed and imagery with additional information such as identification data. For example, in some jurisdictions vehicles such as motorbikes are not required to display license plates on the front of the vehicle. One embodiment of the present invention enables a user to capture an integrated speed measurement with a still image at the time of the violation clearly identifying the vehicle while maintaining motion imagery until a second still image of the vehicle can be obtained that includes the license plate.

According to another embodiment of the present invention, the frame rate control of the motion imagery is dynamically altered based on the status of the object of interest. One key parameter of motion imagery is frame rate. A human being normally can not distinguish between true real motion and a continuous stream of still images displayed at a rate in excess of approximately 25 frames per second. In the United States most television systems refresh the screen at a rate of 30 frames or images per second while in the European Union the refresh rate is 25 frames per second. Images depicting significant changes due to the motion of an object are typically the driving force for the selection of frame rate. An environment that changes minimally on a per second basis can be adequately represented by a slower frame rate while one that is experiencing significant movement is better captured using a higher frame rate. The present invention dynamically adjusts frame rate via a dynamic frame rate control. This control enables frame rate to be reduced or increased based on the system's determination of image alteration. When the image is changing rapidly, the frame rate is increased while when little change is realized the frame rate can be reduced.

Furthermore, just as the present invention can modify the frame rate control, the frame resolution can be adjusted in real time based on the distance and speed of the target. Dynamic resolution control can be set to gain clear imagery or can be set by the user to manage memory storage usage.

Another aspect of the present invention is to adjust the capturing of still imagery in accordance with optical restrictions of the device. As previously explained, laser rangefinder equipment consistent with this invention can accurately measure the speed of an object, such as a vehicle, at a range beyond the cost effective means to legibly capture an image of the license plate and/or vehicle operator. The present invention adjusts the time of a still high quality image to identify a vehicle and/or operator while maintaining a causal chain of evidence from the point at which the violation occurred. According to one embodiment of the present invention, distance measurement data collected to determine whether a speed violation has occurred is also used to determine when the optics of the image capturing device are capable of producing a legible picture of the vehicle and/or operator. During the period in which a still image cannot adequately be captured or in which the resolution of the still image would be inadequate, a continual stream of data from the laser rangefinder is collected regarding the vehicle's speed and distance as well as a motion picture image of the vehicle. Once the distance measuring equipment determines that a still image can be captured, the image sensor 220 alters its resolution and captures a still image. By doing so, positive identification of the vehicle and operator can be obtained even though at the range at which the violation occurred no such image was possible. Such a system enables a less expensive optical system to be tied to the laser range finding equipment. As long as continuous visual contact can be maintained with the vehicle, the maximum range of the laser rangefinder can be utilized to effectively prosecute speed violations.

One embodiment of the present invention minimizes processing time in computing a target's speed by using a sliding window of data collection and analysis. As can be appreciated by one skilled in the relevant art, speed determination using a laser rangefinder is accomplished by firing a series of laser pulses and receiving a series of reflected pulses. Each pulse and its reflected counterpart can determine the distance to an object. By knowing the time between the fired pulses and the differences in the calculated distance, a speed determination can be made. Typically a sample size of pulses, a window, is used to make such a determination. For example a speed determination may be based on changes in distance over time based on a window of five pulse returns.

Data collected by the laser rangefinder's receiver is often inconsistent from one pulse to the next. Even though only a small sample of the total number of pulses may be needed to accurately determine an object's speed, there may be a significant latency in identifying pulses that, as a group, meet the selection criteria. Furthermore, current sampling processes in laser speed detection devices utilize a process that, when a selected number of pulses fails to meet the required quality or consistency parameters, that sample is ignored and another, unique set of pulses is analyzed. If multiple samples are rejected before a sampling of pulses can be used to determine the speed of the device, that determination can be significantly delayed.

According to one embodiment of the present invention, a sliding window is used to determine the speed of an object. Rather than sampling pulses in a step by step fashion, a window encompassing the required number of pulses is incrementally moved along the received returns until a set of qualifying returns is identified to determine the speed of the object.

Figure 3:
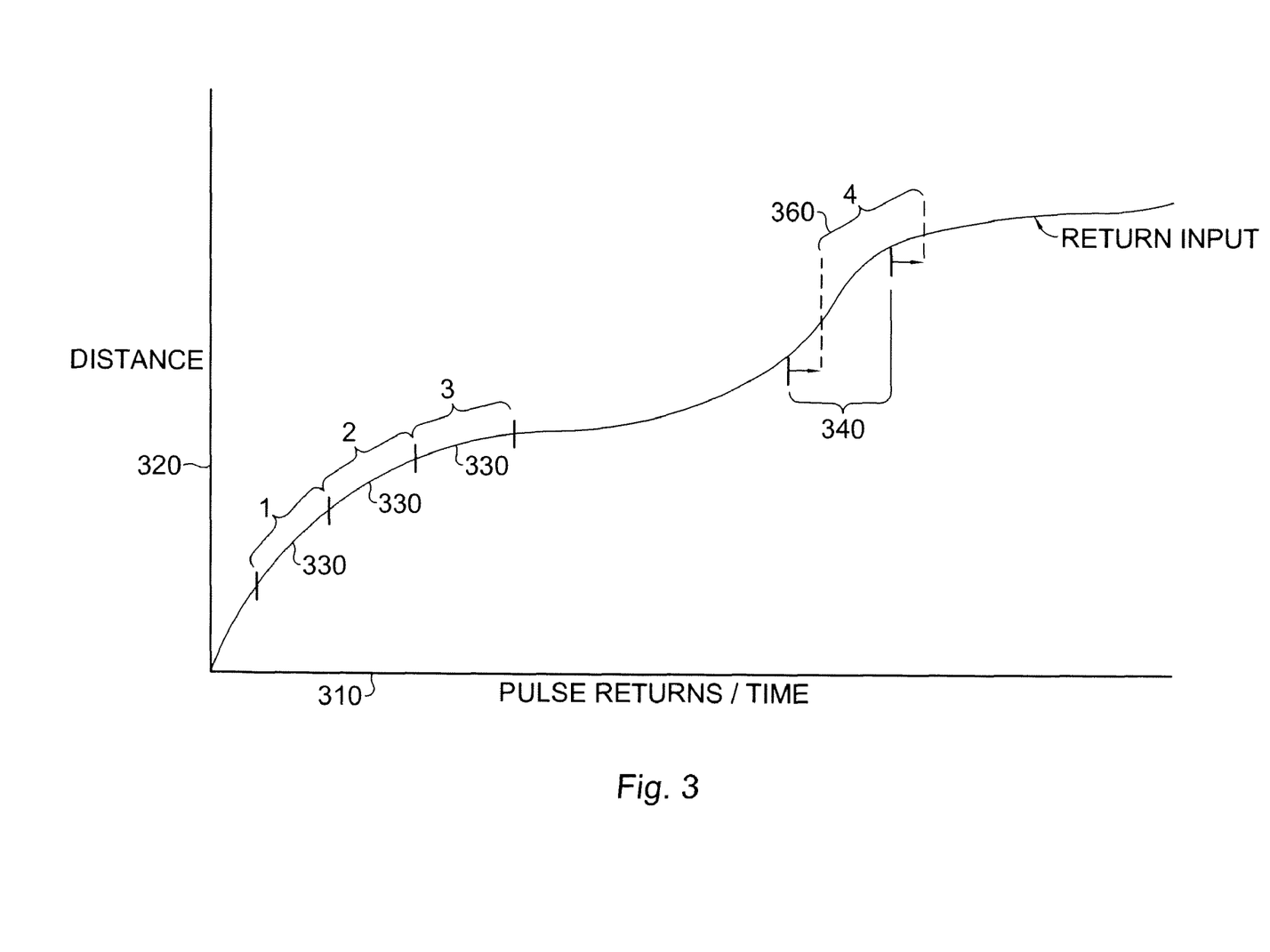
FIG. 3 is a graphical depiction of a sliding scale sampling technique for speed measurement according to one embodiment of the present invention.

FIG. 3 shows a graphical depiction of a sliding scale pulse sampling method according to one embodiment of the present invention. FIG. 3 depicts a graphical representation of the quality pulse returns/times on a horizontal axis 310 versus the distance measurement on a vertical axis 320. Graphically, a determination of distance (and thus speed) from a specified number of pulses can be determined when the input line is consistent, i.e. a straight line. A curved line may indicate that the rate of change of the target's distance precludes an accurate determination of the target's speed. Therefore a sample centered on a curved portion of the line 330 would be rejected forcing the sample window to move to the next set of pulse returns. (see samples 1-3) When the speed of the target is variable as compared to the sample window, the time to gain a consistent sampling of laser pulses so as to determine the distance can be significant. According to the present invention, when a sample is rejected, the sample size is incrementally moved. As shown in pulse sample 4 on the right side of FIG. 3, an initial sampling 340 is over a curved portion of the graph indicating variances in pulse returns within the sample. By sliding slightly to the right and over less than an entire sampling window, the new working sample of pulses 360 lies over an essentially linear portion of the graph indicating that the pulse returns for these particular pulses is consistent enough to provide an accurate distance determination.

A sliding window sampling scheme can significantly reduce the latency that occurs from the initiation of the system to when the laser rangefinder 210 and speed determinator module 250 determine an accurate speed of the target.

Another aspect of the present invention is the ability to wirelessly download the integrated data to a central repository for storage and/or analysis. While the system described herein includes an internal memory for storage of data collected during an initiation of the device, as well as for storage of instructional code to operate the device, it can also possess the ability to periodically or dynamically download the collected data to a server via a wired or wireless network interface. Motion imagery is very memory intensive, and, while only the motion imagery necessary to integrate still images with the speed determination is necessary, the system's versatility is enhanced by the ability to download the data while in the field giving the user a lengthened ability to collect data.

Figure 4:
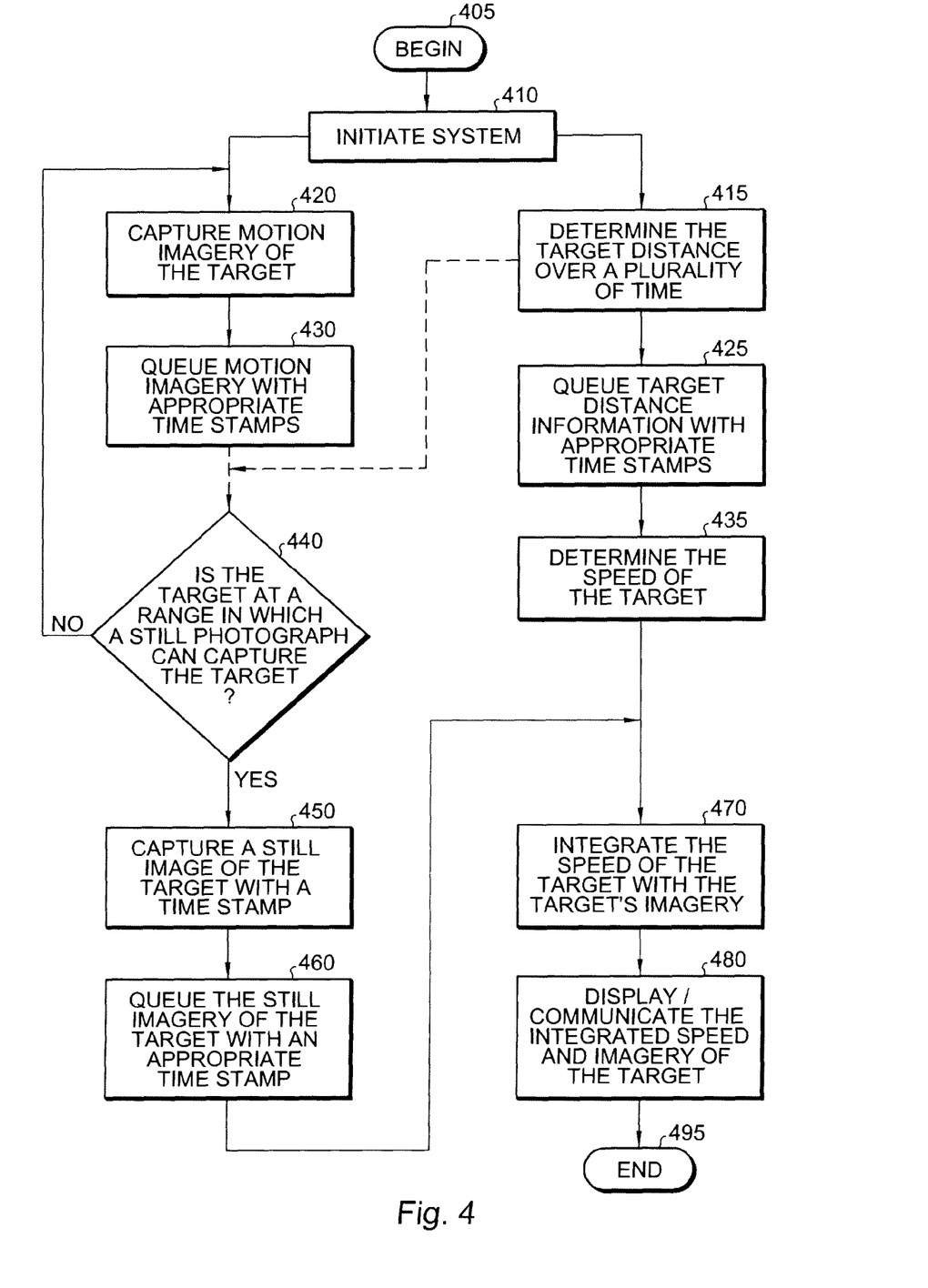
FIG. 4 is a flowchart of one method embodiment for integrating speed measurements with image data according to one embodiment of the present invention.

FIG. 4 is a flowchart illustrating methods of implementing an exemplary process for integrating motion and still imagery with laser rangefinder speed determination. In the following description, it will be understood that each block of the flowchart illustration, and combinations of blocks in the flowchart illustration, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems that perform the specified functions or steps, or combinations of special purpose hardware and computer instructions.

The integration process begins at step 405 with the initiator system (trigger pull) step 410 of the system. In a typical example, initiation of the system occurs when a user identifies a target of interest and directs both the laser rangefinder and the image capture device(s) toward the target so as to determine the target's speed while simultaneously capturing the target's image.

As shown in FIG. 4, the process of the present invention is bifurcated as the laser rangefinder portion of the system initially operates independently of the image capturing portion of the invention. Upon initiation, the laser rangefinder determines at step 415 a distance to the target by detecting reflected laser pulses from the target. This distance data is queued at step 425 in memory and associated with an appropriate time stamp. Thereafter, as distance data is accumulated over a period of time, the speed of the target is calculated 435.

As a distance to the target is determined at step 415 and the data is used to calculate at step 435 the target's speed, motion imagery sensors are immediately activated to capture motion images at step 420 of the target and its environment. As with the distance data, the motion picture data is queued at step 430 and associated with a time stamp. Using distance information obtained from the laser rangefinder, a query is made at step 440 whether the target is within a range at which a still image reliably can be captured. When the response to this query is negative, the method returns to capture motion imagery and queue the time stamped data.

When the response to the query at step 440 is affirmative, meaning that the system believes that, based on the distance determination, a reliable still image can be taken that will positively identify the target, a still image is captured at step 450 and associated with its appropriate time stamp. The still image, along with the motion imagery, is again queued at step 460 for future analysis and use.

With motion and still imagery captured at step 460 as well as the speed of the target determined at step 435, the system then integrates the data at step 470 by matching time stamps. Speeds found to meet a predetermined criteria (for example speeds in excess of a predetermined number) are identified along with their time stamps. Imagery, both motion and still, associated with those time stamps are integrated at step 470. According to one embodiment of the present invention, motion imagery before and after the selected time stamp for a predetermined period of time is captured and associated with the integrated speed. When speed meeting the prescribed criteria indicating a violation fails to match with an existing still image, motion imagery linking the speed determination to a reliable still image is integrated.

The speed information, the still imagery and the motion imagery are thereafter communicated at step 480 to a user via a display and or network connection. The data forming the integrated report is captured on persistent memory or transmitted/communicated to a separate storage facility.

Figure 5A:
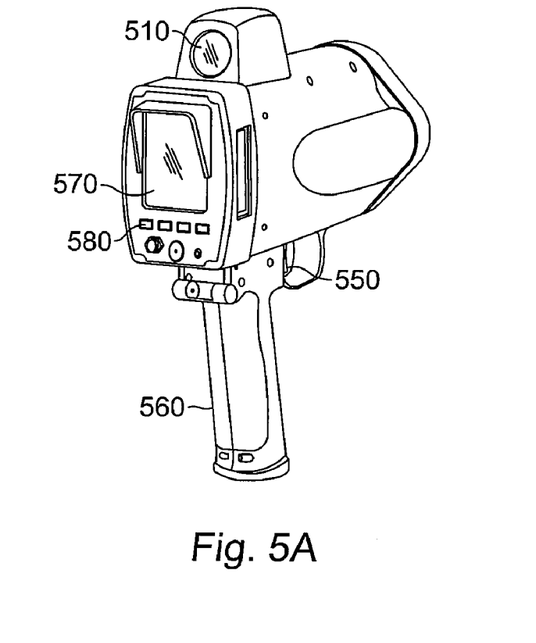
FIG. 5A is a right rear perspective view of an integrated image and speed measurement apparatus encompassing one system embodiment of the present invention.
Figure 5B:
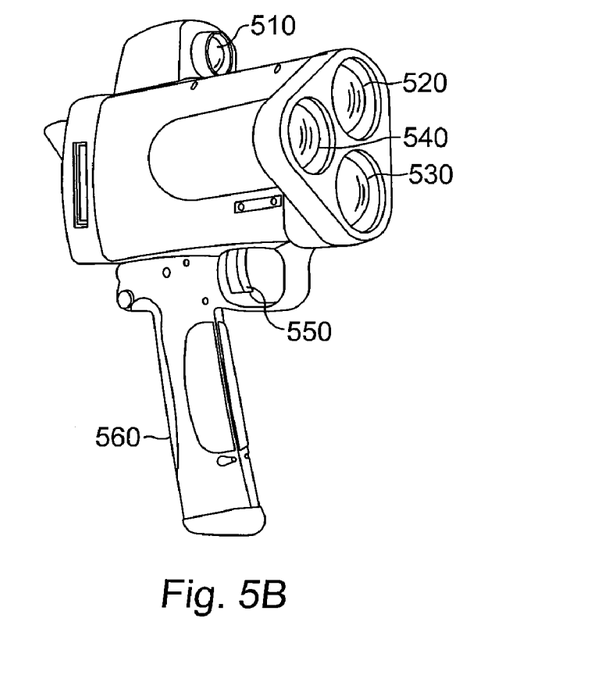
FIG. 5B is a right front perspective view of an integrated image and speed measurement apparatus encompassing one system embodiment of the present invention.

One rendition of an integrated image capturing and speed detection device in accordance with an embodiment of the present invention is shown in FIGS. 5A and 5B. FIG. 5A shows a right rear perspective view of an integrated image and speed measurement apparatus encompassing one system embodiment of the present invention while FIG. 5B shows a right front perspective view of the same integrated image and speed measurement apparatus.

Referring first to FIG. 5B, one embodiment of an apparatus for housing the present invention includes a targeting optic or sight 510 affixed to or integrated with the apparatus. By using the sight the user initially can direct the image capturing and distance measuring devices at the desired moving object. The housing shown in FIGS. 5A and 5B also includes a transmitter port 520 for transmitting range finding pulses used in conjunction with a distance measuring device as well as a receiving port or antenna 530 for reception of reflect energies. In the case of a laser rangefinder, a series of laser pulses are transmitted from the transmitter port 520 toward the moving object. The reflected counterparts of these pulses are detected by the receiving port 530 after a finite period of elapsed time. The system uses this elapsed time to determine the distance to the object. As the distance changes over a period of time, speed of the object can be determined.

Substantially adjacent and co-aligned with both the targeting optic 510 and the transmitting port 520 is an optical lens 540 that is used by both the video/motion imagery devices and the still image device. The distance measuring device and the imagery devices are initiated, according to one embodiment, by a trigger 550.

The apparatus shown in FIGS. 5A and 5B also includes a handle 560 facilitating the aiming of the device toward the moving object of interest and aiding in its portability. Turning to FIG. 5A, a display device 570 can be seen as well as a plurality of user interface controls 580 to facilitate the operation of the apparatus.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with integrating speed and distance determination with motion and still imagery, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A unitary system for integrating image and speed determination data, the system, comprising:
   a common processor block;
   an image sensor coupled to said common processor block and operative therewith to capture images of a target;
   a laser subsystem coupled to said common processor block and operative therewith to determine a distance and speed of said target relative to said system and to determine that a higher resolution image of said target can be acquired by said image sensor; and
   a memory block coupled to said common processor block operative to store said images of said target, including said higher resolution image, received from said image sensor and data representative of said distance and speed of said target received from said laser subsystem,
   wherein said common processor block is operative to determine whether said target is probabilistically uniquely identifiable in said higher resolution image, and
   wherein said common processor block, said image sensor, said laser subsystem and said memory block are disposed within a handheld housing.

2. The system of claim 1 further comprising:
   a battery pack disposed within said handheld housing for supplying operating power to said system.

3. The system of claim 1 further comprising:
   a display device communicatively coupled to said common processor block and operative to display at least one of said images of said target and associated speed data.

4. The system of claim 1 wherein said system is operative to determine a number of time stamps and to associate individual ones of said time stamps with corresponding ones of said images of said target and said speed of said target stored in said memory block.

5. The system of claim 4 wherein said system is further operative to correlate one of said time stamps with said higher resolution image of said target and said speed of said target.

6. The system of claim 1 further comprising:
   a global positioning system coupled to said laser subsystem.

7. The system of claim 1 further comprising:
a global position system coupled to said common processor block.

8. The system of claim 1 further comprising:
an inclinometer coupled to said laser subsystem.

9. The system of claim 1 further comprising:
an inclinometer coupled to said common processor block.

10. The system of claim 1 further comprising:
a wireless link module coupled to said common processor and operative to wirelessly communicate integrated image and speed data to an external database or remote display device.

11. The system of claim 1 further comprising:
a wireless link module coupled to said common processor and operative to wirelessly communicate integrated image and speed data to a remote display device.

12. The system of claim 1 wherein said images of said target and said speed of said target are determined substantially concurrently.

13. A method for integrating object image and speed data, the method comprising:
determining a speed of a moving object using a speed measurement device;
capturing video images of said moving target with an image sensor and storing said images in a memory block with associated instantaneous speeds of said moving object;
determining a distance at which the moving object is probabilistically uniquely identifiable;
capturing a higher resolution still image at said distance of said moving target with said image sensor and storing said higher resolution still image in said memory block, wherein said video images and said higher resolution still image of said moving target are associated with at least one of said determined speeds of said moving object; and
determining whether said moving object is probabilistically uniquely identifiable in said higher resolution still image, and
wherein the integrating object image and speed data are done with a handheld portable device.

14. The method of claim 13 further comprising:
displaying one of said video images or said higher resolution still image with an associated speed of said moving object on a display device.

15. The method of claim 14 further comprising at least one of the following steps:
transmitting said video images, said higher resolution still image and said associated speed of said moving object to an external device;
establishing a time stamp associated with said determining of said speed of said moving object and capturing said time stamp of said video images and said higher resolution still image;
initiating said method upon said moving object exceeding a settable threshold velocity;
initiating said method prior to said moving object exceeding a settable threshold velocity;
manually aiming said image sensor at said moving object.

* * * * *